United States Patent [19]

Troglia et al.

[11] Patent Number: 5,302,314

[45] Date of Patent: Apr. 12, 1994

[54] STABLE AQUEOUS-SUSPENSIONS OF INORGANIC MATERIALS ON SILICA BASIS AND INSOLUBLE IN WATER

[75] Inventors: Claudio Troglia, Milan; Giancarlo Barbero, Arona Novara, both of Italy

[73] Assignee: Enimont Augusta Industriale, Italy

[21] Appl. No.: 999,176

[22] Filed: Dec. 29, 1992

Related U.S. Application Data

[63] Continuation of Ser. No. 629,765, Dec. 18, 1990, abandoned.

[30] Foreign Application Priority Data

Dec. 18, 1989 [IT] Italy .................. 22728 A/89

[51] Int. Cl.⁵ .................. C11D 3/12; C11D 3/37
[52] U.S. Cl. .................. 252/174.23; 252/174.24; 252/174.25

[58] Field of Search .............. 252/135, 140, DIG. 14, 252/174.23, 174.25, 174.24

[56] References Cited

U.S. PATENT DOCUMENTS

| | | | |
|---|---|---|---|
| 4,072,622 | 2/1978 | Kühling et al. ............ | 252/179 |
| 4,692,264 | 9/1987 | Gresser ...................... | 252/174.25 |
| 4,840,746 | 6/1989 | Shiozaki ..................... | 252/DIG. 14 |

*Primary Examiner*—Paul Lieberman
*Assistant Examiner*—Erin M. Higgins
*Attorney, Agent, or Firm*—Morgan & Finnegan

[57] ABSTRACT

This invention relates to aqueous suspensions of water-insoluble inorganic materials on a silica basis and insoluble in water, which are in finely subdivided form, stabilized with at least one organic polymeric material constituted by a partially crosslinked acrylic polymer or copolymer.

8 Claims, No Drawings

STABLE AQUEOUS-SUSPENSIONS OF INORGANIC MATERIALS ON SILICA BASIS AND INSOLUBLE IN WATER

This is a continuation of co-pending application Ser. No. 07/629,765, filed on Dec. 18, 1990 now abandoned.

FIELD OF THE INVENTION

The present invention relates to stable aqueous suspensions of inorganic, silica-based materials insoluble in water, in a finely subdivided form.

The silica-based, water-insoluble inorganic materials used in the present invention are silicalites and the compounds corresponding to formula (I):

$$(Cat_{2/n}O)_x Me_2O_3(SiO_2)_y \qquad (I)$$

wherein:

Cat represents a cation with "n" valency, exchangeable with Ca, x is a numeral comprised within the range of from 0.7 to 1.5, Me is boron or aluminum, and y is a numeral comprised within the range of from 0.8 to 200, and preferably comprised within the range of from 1.3 to 4.

"Cat" cation is preferably sodium, although other cations such as lithium, potassium, magnesium, and so forth, can be used.

Examples of inorganic materials used in the present invention are silicalites, borosilicates and aluminosilicates in both crystalline and amorphous forms.

For the sake of simplicity, in the instant specification reference will be made in particular to sodium aluminosilicates having a molar ratio of $SiO_2:Na_2O$ of about 2:1—these sodium aluminosilicates are generally known as "zeolites of 4 A type"—but all of the information supplied on the use, preparation and properties of these aluminosilicates are applicable as well to the totality of said water-insoluble inorganic materials of formula (I).

BACKGROUND OF THE INVENTION

It is well-known that aluminosilicates, and in particular the zeolites of 4 A type corresponding to the general formula $$Na_2O.Al_2O_3.2SiO_2.4.5H_2O$$

are generally used in detergents and cleansing agents.

These zeolites of 4 A type are interesting for application in the field of detergency in that they are capable of sequestering and fixing calcium ions from aqueous solutions; their calcium fixing power (cation exchange power) is preferably comprised within the range of from 50 to 200 mg of CaO per gram of aluminosilicate.

Due to this reason, the zeolites are valuable substitutes for sodium tripolyphosphate and are used in order to partially or completely replace the latter.

The use of zeolites of 4 A type in the preparation of detergent and cleansing agents led to the development of new technologies of preparation, which require the use of zeolites as aqueous suspension endowed with good characteristics of fluidity and storage stability, even for many days, and containing an amount of zeolite which should be as large as possible.

It is well-known that the zeolites of 4 A type are produced as a finely subdivided powder consisting of particles with an average size comprised within the range of from 0.5 to 10 micrometers.

To be used in the field of detergent and cleansing agents, zeolites of 4 A type are suspended in water and this operation is preferably directly carried out during the manufacture of the same zeolites, after their filtering and washing steps.

For the stabilization of the aqueous suspensions of zeolites—which should still be fluid also after their storage and transport, and should capable of being mixed and pumped through the normal pipes, a large number of stabilizers have been proposed in the past.

Thus, French patent N. 2,287,504 discloses suspensions of water-insoluble aluminosilicates and borosilicates, stabilized with a dispersing agent. Among such dispersing agents, organic polymeric compounds having a molecular weight higher than 1500 and containing carboxy and/or hydroxy groups, and in particular those of natural origin, such as e.g., polysaccharides, are mentioned.

French patent N. 2,512,690 discloses suspensions of zeolites of 4 A type stabilized with a non-ionic surface active agent selected from among macromolecular polymeric organic compounds containing hydroxy groups and with an alkali-metal hydroxide.

European patent application publ. N. 154,291 proposes that the stability of the aqueous suspensions containing a macromolecular polymeric organic compound comprising carboxy and/or hydroxy groups as the stabilizing agent is improved by means of the further addition of xanthan gum.

Italian patent application publ N. 20,238 A/84 proposes that the aqueous suspensions of zeolite are stabilized by means of the addition of a water-soluble resin selected from the group consisting of xanthan gum, guar gum and mixtures thereof.

The aqueous suspensions stabilized with the above cited stabilizer agents are capable of being pumped through the usual pipelines by means of the industrial pumps and are resistant to the vibrations which they are exposed to during their transport, but show the drawback that they cannot be stored without stirring for a long time period without undergoing the phenomenon of decantation. Furthermore, in the case of the aqueous suspensions stabilized by means of the above cited stabilizer agents, the settled material is hard and difficult to be removed.

In Italian patent application publ. N. 19,861 A/87, the drawbacks which affect the prior art have been overcome by using suitable stabilizing agents selected from the group consisting of special quaternary ammonium or phosponium compounds, in combination with polymers containing hydroxy groups.

Unfortunately, these products showed good suspending properties at room temperature, whereas at higher temperatures, i.e., above 50° C., have displayed poorer suspending properties.

The present Applicant has found now that the aqueous suspensions of water-insoluble inorganic materials on silica basis and in finely subdivided form can be improved as regards their useful storage life, if small amounts of a partially crosslinked polymeric material are added, also at higher than room temperature values.

SUMMARY OF THE INVENTION

Therefore, the subject-matter of the present invention are the aqueous suspensions of water-insoluble, silica-based inorganic materials in finely subdivided form, which suspensions are stabilized with at least one organic, polymeric compound constituted by:

(a) at least one monomer selected from the group consisting of acrylic and methacrylic acid;

(b) possibly at least one non-crosslinking acrylic monomer selected from the group consisting of esters, amides and/or nitriles of acrylic acid and/or methacrylic acid;

(c) at least one crosslinking monomer containing at least two double bonds of acrylic and/or allylic and/or vinylic nature; and (d) possibly at least one crosslinking, at least bifunctional, monomer containing a double bond and at least one further chemical function reactive towards the other monomers with acidic, ester, amidic and/or nitrilic function of the (a) and (b) steps.

DESCRIPTION OF THE INVENTION

Any acrylic, non-crosslinking monomers according to (b) step can be used in the preparation of the stabilizer to be used in the suspensions of the present invention, although preferred monomers are methyl acrylate, ethyl acrylate, propyl acrylate, butyl acrylate, methyl methacrylate, ethyl methacrylate, propyl methacrylate, acrylamide, methacrylamide, acrylonitrile, N-acrylamides and methacrylamides, and so forth.

In the same way, the preferred crosslinking monomers of the (c) step are: ethyleneglycol dimethacrylate, allyl acrylate, triallylcyanurate, the allyl esters obtained by starting from polyols, such as pentaerythritol, sorbitol, and so forth, tetraallyloxyethane, methylene-bis-acrylamide, and so forth.

In the monomers of the (d) step the chemical function reactive towards the other functions of the monomers of (a) and (b) steps can be selected from among hydroxy, methylolic, isocyanate, aminic and epoxy functions.

Examples supplied for indicative purposes for the monomers of the (d) step are ethyleneglycol acrylate and methacrylate, methylolacrylamide, methylolmethacrylamide, glycidyl methacrylate, and so forth.

The organic polymeric compound used in the suspensions of the present invention preferably has the following composition, expressed as % values:

i. from 15 to 99.9% by weight, relatively to the total weight, and generally from 30 to 99.9% by weight, of acrylic and/or methacrylic acid;

ii. from 0 to 85% by weight, relatively to the total weight, and generally from 0 to 60%, of a non-crosslinking acrylic monomer selected from the group consisting of esters, amides, and/or nitriles of acrylic and/or methacrylic acid;

iii. from 0.1 to 5% by weight, relatively to the total weight, and generally from 0.5 to 3%, of crosslinking monomers as defined in (c) and (d) steps, where the sum of the percentages relevant to (i), (ii), (iii) components equating 100.

The organic polymeric compound used in the instant suspensions can be prepared, by means of techniques well-known to those skilled in the art, by either radicalic or ionic polymerization in solution, in emulsion, bulk polymerization, and so forth.

The so prepared organic polymeric compound is generally insoluble in water in the acidic state, but turns into soluble and develops its stabilizing activity when its carboxy groups are totally or partially neutralized, e.g., with alkali-metal hydroxides or alkali-earth metal hydroxides such as lithium, sodium, potassium, calcium, magnesium, and so forth, or with the natural alkalinity of the aqueous suspensions of zeolites, as they are obtained from the preparation processes.

The aqueous suspensions of inorganic, silica-based materials of formula (I) stabilized with amounts smaller than 0.4% by weight as referred to the total weight, and generally of from 0.05% to 0.3%, of at least one organic polymeric product according to the present invention are preferred in practice.

The content of silica-based inorganic materials in the aqueous suspensions according to the present invention is comprised within the range of from 30 to 70% by weight.

In general, the inorganic, silica-based, water-insoluble materials used for the productions of the suspensions are in the form of particles having a size comprised within the range of from 0.1 micrometers to 0.1 mm and preferably of from 1 to 10 micrometers. These particles are generally of primary type, i.e., they are formed by precipitation and possibly crystallization; while the secondary particles, i.e., those particles which are formed by agglomeration from the primary particles, are generally absent.

The aluminosilicates can be either amorphous or crystalline products, or mixtures thereof; they can be of natural origin, or of synthetic origin; the latter are preferred. The processes for the production of these compounds and, in particular, of zeolites of 4 A type are well-known and are disclosed in a large number of patents, such as, e.g., in French patent N. 2,447,349. The preferred alumino-silicates are those comprised in the following general composition:

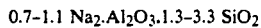

0.7–1.1 Na$_2$.Al$_2$O$_3$.1.3–3.3 SiO$_2$

Soon after being prepared, aluminosilicates appear as a wet filtration cake with a water content comprised within the range of from 40% to 60% by weight. Said filtration cake can be preferably used directly for the preparation of the suspensions according to the present invention, or it can be submitted to a preliminary drying.

The suspensions according to the present invention can be prepared by simply mixing the components thereof. In practice, the use is preferred of the aqueous suspension of the still wet zeolite, as it is obtained from the process used for the industrial preparation thereof, by transforming, by mixing in the presence of the suspending agent according to the present invention, the wet filtration cake obtained after the separation of the mother liquors and after washing with water, into a flowing suspension. For that purpose a further addition of water is generally not required.

Of course, in order to prepare the suspensions according to the present invention also already dried zeolite powder can be used if a still wet zeolite cake from zeolite synthesis is not available for said preparation.

The suspensions according to the present invention can contain up to 70% by weight of 4 A zeolite, of formula

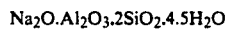

Na$_2$O.Al$_2$O$_3$.2SiO$_2$.4.5H$_2$O which generally corresponds to 56% by weight of anhydrous zeolite (i.e., without the 4.5 moles of crystallization water); in general, the viscosity of the suspensions is comprised within the range of from 150 to 3500 centipoises and said suspensions can be easily transported inside tankers with the formation of deposits difficult to be removed not taking place.

The suspension according to the present invention can be pumped and mixed without any problems also after 30-40 days of storage, retaining its low viscosity both at room temperature and at temperatures of up to 50° C.; also after a very long storage at room temperature, only a very small amount of jelly-like sludge is formed, which can be mixed again.

Besides its good characteristics of stability at room temperature, the suspension according to the present invention displays excellent rheological characteristics also at higher temperature, i.e., at temperatures comprised within the range of from 50° C. to 80° C.

For the subsequent processing for the production of detergent and cleansing agents, the stabilized zeolitic suspensions are used as a raw material according to the manufacturing processes customarily used for the production of such detergent and cleansing agents. It should be furthermore observed that the addition of the suspensions in no way endangers the foaming characteristics of the detergent or cleansing agent.

The stabilized zeolitic suspensions can also be directly converted, by means of the usual drying operations, e.g., by spray-drying or atomization-drying, into a powder which can be easily redispersed in water. In the preparation of detergent and cleansing powders by means of the use of the suspensions according to the invention, in particular according to the atomization-drying method, very highquality products are obtained, with a very low content of dusts.

The suspensions according to the present invention are also very suitable for preparing detergent powder formulations for dish washing.

EXAMPLES

The following examples are supplied for the purpose of illustrating the invention without limiting in any way the purview thereof; the examples describe the use of zeolites of 4 A type, but the invention can be also advantageously applied to other zeolite types, or to borosilicates, as well as to silicalites, in very finely subdivided form.

EXAMPLE A 2000 g of deionized water, 31.2 g of sodium laurylethersulfate, 2.3 g of ammonium persulfate and 0.2 g of sodium metabisulfite are charged to a reactor equipped with stirring means, a condenser and a device for reactant charging. The mixture is heated up to 70° C., then a mixture containing: 700 g of deionized water, 26 g of sodium laurylethersulfate, 550 g of methacrylic acid, 700 g of ethyl acrylate, 9 g of acrylamide, 20.5 g of diethyleneglycol dimethacrylate and 12.5 g of N-methylolacrylamide, is added to it over a time of about 2 hours, and with the temperature of the reaction mixture being kept at 75° C.

The reaction mixture is continuously stirred, so as to obtain a homogeneous emulsion.

After complete addition of the second mixture, the temperature is increased up to 80° C. and is kept at that value for about 30 minutes, until the conversion of monomers is complete.

The so obtained liquid contains about 33% of dry solids and its pH value is of about 4.

EXAMPLE B

The test is carried out as in Example A, with diethyleneglycol dimethacrylate being replaced by 28.8 g of triallylcyanurate.

EXAMPLE C 198 g of acrylic acid, 9.5 g of potassium carbonate, 1800 ml of anhydrous ethyl acetate and 2 g of triallylated pentaerythritol are charged to a reaction vessel equipped with stirring means, a condenser and a device for reactant charging.

The mixture is heated up to 80° C. and then 0.65 g of lauryl peroxide in 100 ml of anhydrous ethyl acetate is added to it.

The reaction mixture is kept about 5 hours at a temperature approximately comprised within the range of from 80° to 58° C., with continuous stirring, then the reaction mixture is cooled down to room temperature.

A suspension is obtained, from which the polymer is recovered by evaporating off ethyl acetate. The so obtained polymer is kept heated at the temperature of 50° C. for 12 hours inside a ventilated oven.

EXAMPLES 1 TO 4

In order to prepare the stabilized suspensions, a wet filtration cake of 4 A zeolite was used. Said 4 A zeolite was prepared by means of the process disclosed in French patent N. 2,447,349 and had the following characteristics:

formula: $Na_2O.Al_2O_3.2SiO_2.4.5H_2O$
crystallinity: 98% (as determined by X-ray analysis);
cation-exchange power with calcium: 170 mg of CaO per g of anhydrous zeolite (i.e., without crystallization water), as determined by means of the method described in French patent N. 2,447,349;
amount of 4 A zeolite contained in the filtration cake: 62.5% by weight ($H_2O=37.5\%$); these figures correspond to 50% by weight of anhydrous 4 A zeolite (i.e., without the 4.5 moles of crystallization water);
granulometry (as determined by means of the Coulter Counter meter):

| Particle size | Amount (%) |
| --- | --- |
| >15 micrometers | 1 |
| >10 micrometers | 2 |
| >8 micrometers | 3 |
| >6 micrometers | 5 |
| >4 micrometers | 32 |
| >2 micrometers | 85 |

Preparation of the Suspensions 20 kg of wet filtration cake of 4 A zeolite was stirred at room temperature until a suspension was formed, which could be stirred very well.

To the so obtained suspension the stabilizers of the type reported in following Table I were slowly added—in the amounts also reported in said table.

After approximately 90 minutes of stirring, homogeneous suspensions were obtained which contained the stabilizers and were free from clumps and agglomerates.

The viscosity of the suspensions was determined at 20° C. and at 50° C. by means of the "Brookfield" viscometer at 20 rpm.

Furthermore, the suspensions were evaluated according to the criteria of formation and consistency of the possibly formed settled solids.

Test Method

A polyethylene container of 1 liter of volume and an opening of 3 cm was used. The filling level of the container was 100%. The filled container was left standing for a certain time period, said "storage time".

After the expiry of the storage time, the height of the region of clear liquid above the suspension was measured. The sedimentation behaviour of the suspension is expressed as "percentage of suspension". Consequently, the expression "100% of suspension" means that a clear liquid phase was not formed.

The consistency of the settled solids possibly formed at the end of the storage time was determined by means of a test of suspension pouring (container emptying). On the basis of the behaviour of the suspension and of the settled solids, the following evaluation marks were assigned:

1 = the container is completely emptied within a 2-minute time, without any settled solids remaining inside it;

2 = the container is completely emptied within a 5-minute time, with a thin film of settled solids remaining inside it;

3 = the container is completely emptied, but a body of settled solids of hard consistency and difficult to be suspended again remains inside it.

TABLE I

|  | Examples | | | |
| --- | --- | --- | --- | --- |
|  | 1 | 2 | 3 | 4 (*) |
| Anhydrous 4A zeolite | 50 | 50 | 50 | 50 |
| Suspending agent: | | | | |
| *type | A | B | C | D |
| *amount | 0.25 | 0.15 | 0.15 | 0.25 |
| Viscosity (centipoises): | | | | |
| *at 20° C. | 600 | 450 | 800 | 400 |
| *at 50° C. | 300 | 250 | 450 | 250 |
| Suspension percentage: | | | | |
| *after 10 days | 98 | 96 | 96 | 80 |
| *after 20 days | 96 | 90 | 90 | 80 |
| *after 30 days | 95 | 85 | 87 | 80 |
| Behaviour: | | | | |
| *after 10 days | 1 | 1 | 1 | 3 |
| *after 20 days | 1 | 2 | 2 | 3 |
| *after 30 days | 2 | 3 | 3 | 3 |

(*) The "D" suspending agent of Example 4 is constituted by a polymer obtained by means of the "A" process without using a crosslinking monomer.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Aqueous suspensions containing from 30-70% by weight based on the aqueous suspension of water-insoluble, anhydrous silica-based inorganic materials in finely subdivided form, which suspensions are stabilized with 0.05 to 0.4% by weight based on the aqueous suspension of at least one organic, partially crosslinked polymeric compound comprising:

(a) from 15 to 99.9% by weight based on the organic, partially crosslinked polymeric compound of at least one monomer selected from the group consisting of acrylic and methacrylic acid;

(b) 0 to 85.0% by weight based on the organic, partially crosslinked polymeric compound of at least one non-crosslinking acrylic monomer selected from the group consisting of esters, amides, and nitriles of acrylic acid or methacrylic acid and mixtures thereof;

(c) at least one crosslinking monomer containing at least two double bonds, said monomer is selected from the group consisting of those having acrylic, allylic, and vinylic moieties and mixtures thereof; and (d) optionally at least one crosslinking, at least bifunctional, monomer containing a double bond and at least one further chemical function reactive towards the other monomers with acidic, ester, amidic, or nitrilic function of components (a) and (b), wherein components (c) and (d) are present in an amount ranging from 0.1 to 5% by weight relative to the total weight of the organic, partially crosslinked polymeric compound.

2. Aqueous suspensions according to claim 1, wherein the reactive chemical function of the monomers of component (d) is selected from among hydroxy, methylolic, isocyanate, aminic and epoxy functions.

3. Aqueous suspensions according to claim 1, wherein the silica-based inorganic material corresponds to formula (I):

$$(Cat_{2/n}O)_x Me_2O_3 (SiO_2)_y \qquad (I)$$

wherein:

Cat represents a cation with "n" valency, exchangeable with Ca, x is a numeral within the range of from 0.7 to 1.5, Me is boron or aluminum, and y is a numeral within the range of 0.8 to 200.

4. Aqueous suspensions according to claim 3, wherein the silica-based inorganic material is an aluminosilicate.

5. Aqueous suspensions according to claim 4, wherein the aluminosilicate is a zeolite of 4 A type corresponding to the formula $$Na_2O.Al_2O_3.2SiO_2.4.5\ H_2O$$

having an average granulometry within the range of from 0.5 to 10 micrometers and a calcium fixing powder within the range of from 50 to 200 mg of CaO per gram of aluminosilicate.

6. Aqueous suspensions according to claim 1, wherein the concentration of acrylic or methacrylic acid is from 30 to 99.9% by weight.

7. Aqueous suspensions according to claim 1, wherein the concentration of crosslinking monomers defined in components (c) and (d) is from 0.5 to 3%.

8. Aqueous suspensions according to claim 3, wherein y is within the range of from 1.3 to 4.

* * * * *